No. 769,269. PATENTED SEPT. 6, 1904.
D. W. McLEAN.
GEAR FOR BELT DRIVING MOTOR CYCLES OR CARS.
APPLICATION FILED JULY 13, 1903.
NO MODEL.
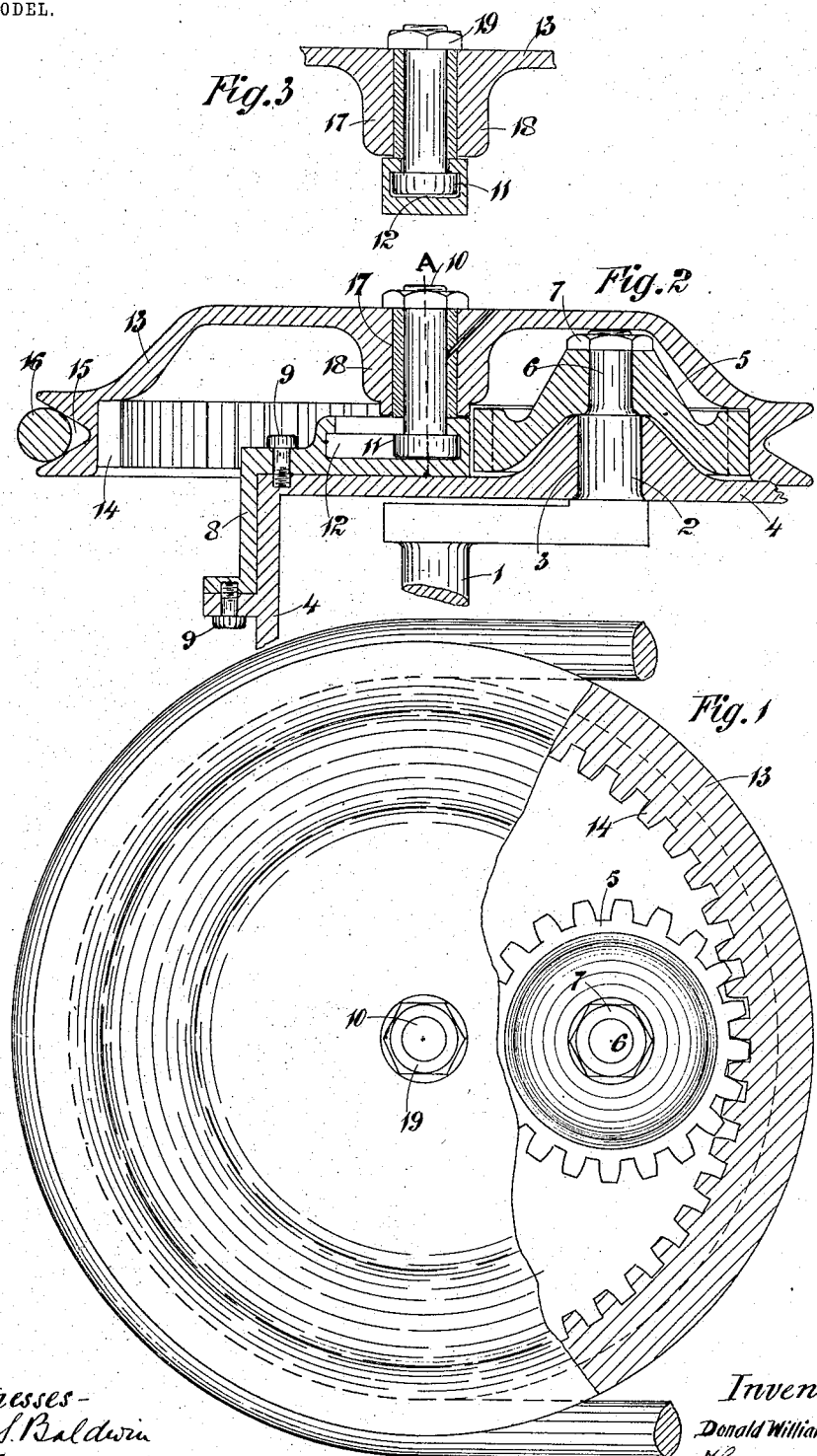
Witnesses—
E. S. Baldwin
George Arnold
Inventor:—
Donald William McLean
By Henriett Haywood
Attorney No. 769,269. Patented September 6, 1904.

UNITED STATES PATENT OFFICE.

DONALD WILLIAM McLEAN, OF METHVEN, NEW ZEALAND.

GEAR FOR BELT-DRIVING MOTOR CYCLES OR CARS.

SPECIFICATION forming part of Letters Patent No. 769,269, dated September 6, 1904.

Application filed July 13, 1903. Serial No. 165,304. (No model.)

*To all whom it may concern:*

Be it known that I, DONALD WILLIAM MC-LEAN, a subject of His Majesty the King of Great Britain and Ireland, residing at Mount Hutt, Methven, in the Provincial District of Canterbury, in the Colony of New Zealand, have invented new and useful Improvements in Gear for Belt-Driving Motor Cycles or Cars, of which the following is a specification.

The object of this invention is to enable the pinion-wheel, which is carried upon the crank-shaft of a motor driving a cycle or the like and which pinion gears with the teeth of a main driving-wheel around which a driving-belt is passed, to be readily substituted for another, whereby the speed of said main driving-wheel may be varied without it being necessary to alter the normal speed of the motor.

According to this invention the crank-shaft is extended through the crank-chamber, in which it has a bearing, and upon the end of the shaft a toothed pinion is secured. This pinion gears with a wheel having internal teeth and grooved on the outside to receive the driving-belt. The wheel is pivoted upon a stud which is secured to an attachment fixed to the crank-chamber. The stud is adjustable to take wheels of different diameters.

The accompanying drawings illustrate my invention.

Figure 1 is a side elevation, partly in section; Fig. 2, a sectional plan; and Fig. 3, a cross-section on line A A, Fig. 2.

1 is the crank of the crank-shaft 2, which has a bearing 3 in the crank-chamber 4. A toothed pinion 5 is fixed to the end 6 of the crank-shaft which projects beyond the said bearing. A nut 7, screwed upon the end 6, retains the pinion in position.

An attachment or bracket 8 is secured to side of the crank-chamber by screws 9 and is provided with a stud 10, having a head 11, and adjustable in a slot 12, formed in the bracket 8.

A wheel 13, having internal teeth 14, fits upon the stud 10 and gears with the pinion 5. The rim of the said wheel has a groove 15 to receive a driving-belt 16.

A sleeve 17, slightly longer than the distance through boss 18 of the wheel 13, is fitted upon the stud 10, and a nut 19, screwed upon the end of the said stud 10, grips the sleeve and secures the stud in position, while the wheel 13 has freedom to rotate. This wheel may be fitted with ball-bearings. The stud 10 is adjustable laterally to suit wheels of different diameters.

What I claim as my invention, and desire to secure by Letters Patent, is—

The combination for the purpose indicated of a crank-shaft 2, crank 1, a support 4, a toothed pinion 5, upon said crank-shaft, the bracket 8, having a slot 12, and means for securing said bracket to the support, the stud 10, adjustable in said slot, an internally-toothed wheel 13, carried upon said stud and gearing with said pinion, the rim of said wheel having a groove to receive a driving-belt, as specified.

In testimony whereof I affix my signature in presence of two witnesses.

DONALD WILLIAM McLEAN.

Witnesses:
 A. H. HART,
 L. R. SMITH.